Figure 1:
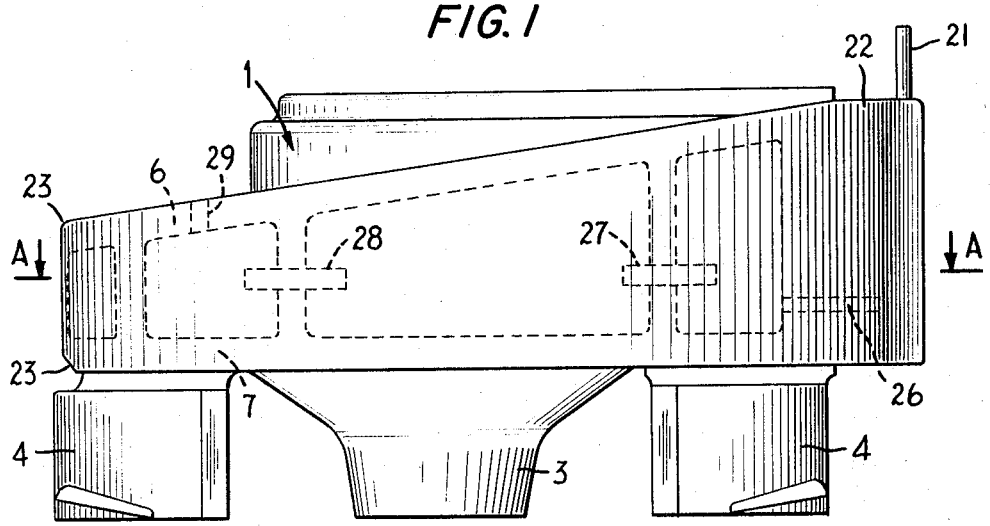

Jan. 24, 1967  A. F. ENEMARK  3,300,126
CYLINDER AND CYLINDER HEAD ASSEMBLY AND METHOD
OF MANUFACTURING SAID ASSEMBLY
Filed June 1, 1965

United States Patent Office 3,300,126
Patented Jan. 24, 1967

3,300,126
CYLINDER AND CYLINDER HEAD ASSEMBLY AND METHOD OF MANUFACTURING SAID ASSEMBLY
Arne F. Enemark, Sonderborg, Denmark, assignor to Danfoss A/S, Nordborg, Denmark, a company of Denmark
Filed June 1, 1965, Ser. No. 460,269
Claims priority, application Germany, June 1, 1964, D 44,581
8 Claims. (Cl. 230—238)

The present invention relates to a cylinder, and cylinder head assembly, and to a method for assemblying such a cylinder and cylinder head assembly together, and more particularly to such an assembly for use in compressors, for example for refrigeration machinery.

It has been the practice in the past to close a cylinder by means of a separate cylinder head and secure the assembly together, for example by means of screws or bolts; or, in cheaper constructions, by forming, or swaging an edge of the cylinder, or the head about the other unit. Such construction has lead to difficulty in casting or machining of muffler or sound absorbing chambers, or of the valve chambers and manifolds. Particular difficulty has been experienced to form such chambers in a single unit cast structural element, in order to avoid separate assembly steps or assembly devices such as rivets, screws or bolts.

It is an object of the present invention to provide a cylinder and cylinder head assembly, and a method of assemblying these two elements together, which is easily manufactured and structurally strong.

According to the present invention, the cylinder and cylinder head assembly are encircled by a strong band, for example of steel or aluminum, which has the multiple function of securing the elements together, and further defines together with the outer walls of the cylinder and or the cylinder head and projections thereon the desired valve manifold chambers or muffler chambers.

In order to securely hold the cylinder head against the cylinder, the band must be under some tension. This tension is uniform throughout the entire band and thus simultaneously provides for the proper sealing of the chambers formed beneath the band and between the outer walls of the cylinder, and the band. This construction has the additional advantage, that the cylinder bearing counter pressure can be absorbed. The usual construction of cylinder blocks, and particularly for compressors, provides for bearings formed in the side walls of crankcase portion of the cylinder block. During the compression stroke, the force of the compression against the cylinder head is counteracted by a similar reactive force on the main bearing. The band, encircling both the cylinder head and the cylinder absorbs these counteracting forces without causing a substantial strain on the cylinder block or on the head. Since the cylinder block with the bearing portion, that is the region of the crank case, is usually a casting, the band adds additional strength to the entire unit.

Various methods may be utilized to secure the band to the assembly. For example, the band may be welded together or secured together by swaging the ends over each other. In order to provide for application of the band to the assembly under substantial tension, it may be first heated and then permitted to cool and thus shrink over the assembly. A particularly advantageous method it is to assemble the cylinder and cylinder head together and place a unitary metallic band thereover, which is deformed by a strong magnetic field and pressed tightly against the cylinder and cylinder head. This can be achieved by placing a magnetic coil around the assembly, and discharging a condenser through the coil. The metallic band acts as a secondary winding of the transformer. The resulting electro-magnetic forces cause the band to tightly surround the structure elements which it encloses with substantial force.

Figure 2:
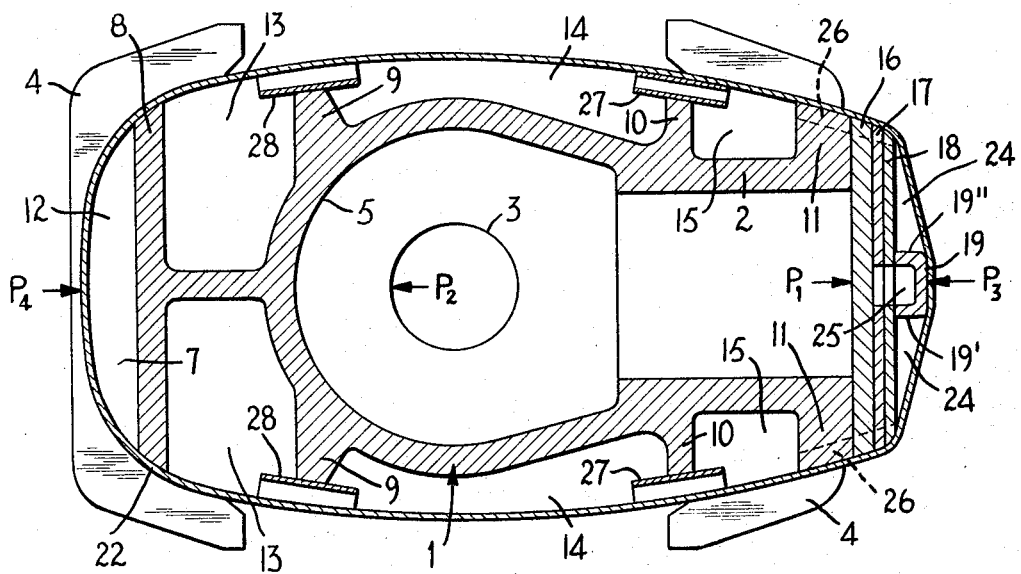
Figure 3:
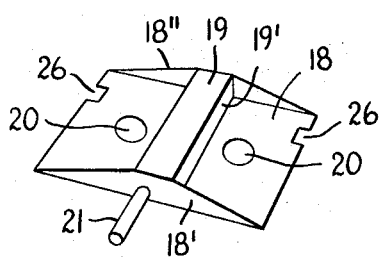

The structure, organization and operation of the invention will now be described more specifically in the following detailed description with reference to the accompanying drawings, in which:

FIG. 1 is a side view of an assembled compressor cylinder and cylinder head surrounded by a securing band;
FIG. 2 is a sectional view along line A—A of FIG. 1; and
FIG. 3 is a perspective view of parts of the structural assembly of the cylinder head.

Referring now to the drawings, and particularly to FIGS. 1 and 2: a unitary casting 1 encloses the cylinder 2, the main bearing 3 and supports generally shown as 4. Interior wall 5 forms the crankcase. Side walls 6 and 7 (FIG. 1) and cross ribs 8, 9, 10 and 11 project outwardly. Side walls 6 and 7 as well as the cross ribs 8, 9, 10 and 11 form, together with the wall of the cylinder 2 and the outer portion of the crankcase housing 5, a plurality of recesses 12, 13, 14 and 15, facing outwardly, which are to be used as muffler or sound absorbing chambers, as will appear in more detail below.

The cylinder head is closed off by means of a valve plate 16; the valves themselves are not shown for clarity and do not form part of the present invention. An intermediate plate 17 and a pair of elements 18 and 19 complete the head assembly. Elements 18 and 19, although dissimilar, are generally U-shaped. As shown in FIG. 3, element 18 has two outstanding legs 18' and 18''; element 19 (FIG. 2) likewise has projecting legs 19' and 19''. The two U-shaped elements are assembled together in such a manner that the major axes of the U are off set by a right angle with respect to each other, and such that the legs of the U face each other (see FIG. 3). Valves openings 20 are formed in the U-shaped element 18. Leg 18' of U-shaped element 18 (FIG. 3) is formed with an opening through which a pressure tube 21 is secured.

A band 22, for example of aluminum, is placed around structural elements 1, 16, 17, 18 and 19. By means of an electromagnetic forming process it is pressed tightly around the elements. During this forming process, the band does not encircle the circumferential surface but rather presses itself against the smallest circumferential outline of the entire assembly. The edges 23 of the band, if it is made larger than the distance between sidewalls 6 and 7, will form themselves around the sidewalls as seen in 23 (FIG. 1). Thus, the band tightly secures all elements snugly together and simultaneously forms the chambers 12, 13, 14 and 15, as well as a pair of suction manifold chamber 24 (FIG. 2). The pressure manifold chamber 25 is formed by the U-shaped element 19. The bottom wall of element 18, and plate 17 may have a central opening as seen in FIG. 2, to provide for communication. Element 19 separates the suction manifold chambers 24 from the pressure manifold chamber 25. In order to provide for communication between muffler chambers 15, and chambers 24, notches or recesses 26 (FIG. 1, FIG. 3) are formed in the walls 11 of the cylinder, and in plates 16, 17, and the U-shaped element 18, in order to form a communication channel together with the band 22.

Band 22 can also be used to secure other structural elements to the cylinder or the cylinder head respectively. For example, a tube 27, set into a recess of rib 10 can be secured thereby; similarly, a U-shaped trough 28 may be set into a recess of cross rib 9. Trough 28, together with the band 22 forms a throttling communication between chambers 13 and 14. Tube 27 likewise forms communication between the chambers 14 and 15, and if of small diameter, likewise will have throttling characteristics.

When all chambers are used as a muffler for the suction line, an additional pressure muffler may be placed on the outside of the assembly and secured by means of the band.

The supply and removal of the medium to be compressed, may be independent of the band 22. This is shown for example for the pressure conduit 21. A suction conduit can be provided for example by means of a bore 29 formed inside wall 6 for each of the chambers 13 (see FIG. 1). Of course, a tube could also be inserted for example through a notched recess taken out of side wall 6.

Force acting on the valve plate 16, shown schematically by the arrow $P_1$ during the compression stroke is counteracted by a similar force in the main bearing, $P_2$. In the past, these forces had to be absorbed as tension over structural unit 1 and threads of any connecting screws or cylinder head bolts. In accordance with the present invention, these forces and counterforces, are absorbed by the band 22 and transmitted by the band itself as shown by arrows $P_3$, $P_4$. Thus, if the cylinder block 1 is a casting, it will be subjected only to compression and further the entire loading on the casting can be uniformly distributed around its circumference.

The present invention has been illustrated in connection with a cylinder and cylinderhead assembly for refrigeration machinery compressors. Many variations and structural changes may be made without departing from the inventive concept. For example the tension band 22 may be used additional to smaller, and weaker screw connections between cylinder head and cylinder itself. Other variations may also be made. The sound absorbing chambers 9 may be arranged in various forms; for example, one side may be used as a muffler for the suction side of the compressor and the other side of the chambers for the pressure side. The entire structural assembly may be substantially circular in cross section; it is not necessary however that this be the case and magnetic deformation can be efficiently accomplished also with many other shapes.

I claim:

1. Cylinder and cylinder head assembly comprising a cylinder portion; a cylinder head portion; projections formed on at least one of said portions; a band encircling said cylinder portion and said head portion and bearing against said projections, said band being under tension, and, conjointly with the side wall of one of said portions and said projection defining a chamber closed off against the outside of said assembly.

2. Cylinder and cylinder head assembly as claimed in claim 1 wherein said cylinder portion is formed with a crankshaft bearing portion in the region opposite said cylinder head portion, said encircling band bearing against said crankshaft bearing portion.

3. Cylinder and cylinder head assembly as claimed in claim 1 wherein projections are formed on both said portions, said projections forming bearing surfaces for said band, said band enclosing both said portions and bearing against said projections to define a plurality of manifold chambers.

4. Cylinder and cylinder head assembly as claimed in claim 3 including recesses formed in said projections to provide channels communicating between said manifold chambers.

5. Cylinder and cylinder head assembly as claimed in claim 1 wherein said cylinder head portion includes a pair of U-shaped members having oppositely facing legs and having their axes arranged at right angles to each other.

6. Cylinder and cylinder head assembly as claimed in claim 5, wherein said band encircles the base of one of said U-shaped members and bears against the legs of the other of said U-shaped members to secure said members in place and, conjointly with the outside wall of the legs of said one U-shaped member and the inside walls of the legs of said other U-shaped member defines a manifold chamber.

7. Cylinder and cylinder head assembly as claimed in claim 1 including at least one additional structural unit enclosed by said band and secured thereby to said assembly.

8. Refrigeration compressor cylinder and cylinder head assembly comprising a cylinder unit having a ribbed outer wall and projecting side walls; a head unit having projecting side walls; a unitary tension band enclosing said outer walls and said side walls and defining manifold chambers there beneath; and compressor fluid communication means formed in said side walls to provide for communication with said chambers.

References Cited by the Examiner

UNITED STATES PATENTS

| | | | |
|---|---|---|---|
| 2,798,663 | 7/1957 | Chagre et al. | 230—186 |
| 2,864,551 | 12/1958 | Heidorn et al. | 230—58 |

ROBERT M. WALKER, *Primary Examiner.*